United States Patent  [11] 3,607,260

[72] Inventors Karel Eugeen Verhille
Mortsel-Antwerp;
Andre Jan Conix, Antwerp, both of Belgium
[21] Appl. No. 872,425
[22] Filed Oct. 29, 1969
[45] Patented Sept. 21, 1971
[73] Assignee Gevaert-AGFA N.V.
Mortsel, Belgium
[32] Priority June 25, 1965
[33] Great Britain
[31] 27130/65
Continuation of application Ser. No. 560,791, June 27, 1966, now abandoned.

[54] MIXED-RESIN BINDERS FOR ELECTROPHOTOGRAPHIC PLATES
7 Claims, No Drawings
[52] U.S. Cl. .................................................. 96/1.8, 96/1.5, 260/21, 260/29.4
[51] Int. Cl. .................................................. G03g 5/06, G03g 5/08
[50] Field of Search .................................................. 96/1.5, 1.8

[56] References Cited
UNITED STATES PATENTS

| | | | |
|---|---|---|---|
| 2,959,481 | 11/1960 | Kucera | 96/1 |
| 2,997,387 | 8/1961 | Tannenbaum | 96/1 |
| 3,152,895 | 10/1964 | Tinker et al. | 96/1 |
| 3,160,503 | 12/1964 | Cady | 96/1 |
| 3,274,000 | 9/1966 | Noe et al. | 96/1.5 |
| 3,345,162 | 10/1967 | MacFarlane | 96/1.8 |
| 3,404,979 | 10/1968 | Bonjour | 96/1.8 |
| 3,447,957 | 6/1969 | Behringer | 117/201 |
| 3,454,415 | 7/1969 | Bonjour | 117/34 |

*Primary Examiner*—George F. Lesmes
*Assistant Examiner*—John C. Cooper

ABSTRACT: Electrophotographic recording material having a layer of finely divided photoconductor, preferably photoconductive zinc oxide dispersed in an insulating binder medium which is the cured reaction product of a mixture of a melamine-formaldehyde resin and a salt of a volatile base and an alkyd resin which contains free acid groups and is insoluble in water in acidic form, both the melamine-formaldehyde resin and the salt being water soluble prior to curing. The layer is preferably applied from an aqueous alkaline coating composition. A preferred range of proportions is 90–40 percent of the melamine resin and 10–40 percent of the salt.

MIXED-RESIN BINDERS FOR ELECTROPHOTOGRAPHIC PLATES

This application is a continuation application of Ser. No. 560,791, filed June 27, 1966, now abandoned.

This invention relates to recording members suitable for use in electrophotography and to processes of producing same.

Photoconductive binder-type coatings prepared by incorporating a finely divided photoconductor in a binder are well known. Such coatings offer certain advantages over the rigid selenium coatings in respect of their flexibility and their fitness for being spectrally sensitized.

In such coatings, various inorganic as well as organic substances can be incorporated as photoconductive substances, e.g. sulphur, selenium, the oxides, sulfides and selenides of zinc, cadmium, mercury, antimony, bismuth and lead, anthracene, anthraquinone and more recently discovered organic monomeric and polymeric organic photoconductors, such as e.g. those described in the Belgian Pat. Specification No. 587,300, the U.K. Pat. Nos. 964,871, 964,873, 964,874, 964,875, 964,876, 964,877, 964,879, 970,937, 980,879 and 980,880, in the German Pat. No. 1,058,836 and in the Canadian Pat. No. 568,707.

The use of photoconductive substances combined with insulating binder agents is known among others from the U.S. Pat. Nos. 2,197,552, 2,297,691, 2,485,589, 2,551,582 and 2,599,542 and from the United Kingdom Pat. Nos. 566,278, 693,112 and 700,502.

Phosphor-type photoconductive materials and specially doped cadmium sulfide dispersed in a silicone resin binder are described by E. Wainer, Photogr. Eng. 3 (1952) 12. Such layers are suitable for image formation by persistent internal polarization, which technique has been described by H. P. Kallmann and J. Rennert, Electronics, Aug. 28, 1959, p. 39–41. Thermoplastic recording layers containing a thermoplastic photoconductive polymer or thermoplastic polymer with a photoconductor dissolved or dispersed therein are suitable for the thermoplastic recording technique described in United Kingdom Pat. No. 964,881.

C. I. Young and H. C. Greig, R.C.A. Rev. 15(1954) 469, describe an electrophotographic material containing a photoconductive layer comprising a specially prepared photoconductive zinc oxide in an insulating resin binder. Said layer is coated on a sufficiently conductive paper base, e.g. a clay-coated paper, from a paintlike coating mixture by conventional paper-coating techniques. Since the zinc oxide has a brilliant white color it forms an excellent base for contrasting with the developer materials applied to it.

According to existing techniques, the photoconductive binder coatings are prepared by dispersing or dissolving the photoconductive substances in a solution of an insulating binder, and by applying them as such in the form of a layer to an appropriate relatively conductive support.

Now we have found that a photoconductive recording member having interesting properties for recording electromagnetic radiation images can be prepared from a dispersion of a photoconductor in an aqueous medium containing in dissolved state a mixture of
 a. a melamine-formaldehyde condensate, and
 b. a salt of a volatile base and an alkyd resin containing acid groups, which resin is insoluble in water in its acidic form.

The ratio by weight of melamine-formaldehyde condensate to the salt of the volatile base and the alkyd resin containing acid groups lies preferably between 1 to 9 and 7 to 3.

A recording layer prepared from the above-mentioned dispersion is characterized by a fast curing or hardening at room temperature so that a curing at elevated temperatures in a curing oven is not strictly necessary. In consequence thereof the recording layer reaches very quickly a usable electrostatic chargeability without having been cured at elevated temperature i.e. at a temperature above 100° C.

The application of aqueous coating compositions requires no special coating techniques and offers all the advantages associated with the absence of organic solvents in the coating composition.

The recording element prepared according to the present invention possesses the property of regaining very rapidly, after charging and exposure, its original dark-resistivity so that this element is extraordinarily suitable for multicolor reproduction wherein generally at least two successive chargings and exposures of the element are required.

The recording element prepared according to the present invention is flexible, possesses a very good mechanical strength and shows a strong adhesion to a paper support as well as to a metal support, e.g., an aluminum support.

Due to a cross-linking reaction on drying between the alkyd resin and the melamine-formaldehyde resin, the photoconductive coating composition according to the present invention offers the advantage of not dissolving in an alkaline aqueous liquid. Moreover the resistance of the photoconductive coatings according to the present invention to nonpolar organic solvents is so high that they do not at all absorb these solvents.

By virtue of these properties the recording layers are very well suited for electrophotographic reproduction techniques wherein an insulating hydrocarbon liquid containing charged pigment particles is used (electrophoretic development).

The dark-resistivity and resistance to moisture of a recording element according to the present invention, when containing photoconductive zinc oxide, may be increased e.g. by the use of at least one of the acid compounds, preferably the organic derivatives of oxyacids derived from phosphorus, described in the Belgian Pat. Specification No. 612,102.

The photoconductive zinc-oxide-containing recording elements according to the present invention are especially suited for electrophotographically preparing planographic printing plates, due to their extreme wear resistance when cured only for 1 minute at 100° C.

The hydrophilization of the nonprinting areas can be carried out in common way without difficulties.

Two basic types of melamine resins are commercially available for use in the photoconductive coating compositions of the present invention: unmodified and modified (etherified) melamine-formaldehyde polymers. Both types are marketed as spray-dried powders and as solutions of about 60 percent of solid resin in water. The solutions may contain some alcohol for improvement of the storage stability. Spray-dried resin powders are produced under the trade name CYMEL by American Cyanamid Company, New York, N.Y., U.S.A. and under the trade name RESIMENE by Monsanto Chemical Company St. Louis, Mo., U.S.A. Melamine resin solutions are marketed under the trade name CATALIN RESIN by Reichhold Chemicals Inc., White Plains, N.Y., U.S.A.

The water-soluble melamine-formaldehyde resins contain at least 2 moles of formaldehyde per mol of melamine.

As suitable melamine-formaldehyde resins containing several N-methylol groups may further be mentioned: a methylolmelamine resin (e.g. RESLOOM HP of Monsanto Chemical Company); dimethyltrimethylolmelamine (AEROTEX M-3 or PAREX 613 of American Cyanamid Company); trimethylolmelamine (AEROTEX 605 or PAREZ 607 of American Cyanamid Company); tetramethylolmelamine (RESLOOM HP Special, Monsanto Chemical Company), tetramethylpentamethylolmelamine (RESLOOM LC-48, Monsanto Chemical Company); a tetramethylhexamethylolmelamine and pentamethylhexamethylolmelamine.

More particularly suitable melamine-formaldehyde resins are listed in the following table 1.

TABLE 1

1. PAREZ RESIN 613 (a dimethyltrimethylolmelamine marketed by American Cyanamid Company).

2. PAREX RESIN 607 (a melamine-formaldehyde resin marketed by American Cyanamid Company).

3. EPOK-W-9801 (a 72 to 75 percent aqueous solution of a melamine-formaldehyde resin marketed by British Resin Products Ltd., London).

4. CYMEL 405 (a melamine-formaldehyde resin marketed by American Cyanamid Company).

5. RESLOOM HP (a methylolmelamine resin marketed by Monsanto Chemical Company).

6. CASSURIT-MLP (partially etherified melamine-formaldehyde resin marketed by Cassella Farbwerke Mainkur A.G. Frankfurt (Main)-Fechenheim, W. Germany).

Water-insoluble alkyd resins suitable for use in the present invention have to contain sufficient acid groups to enable the solubilization in water by means of a base.

More particularly suitable alkyd resins are listed in the following table 2:

TABLE 2

1. EPOK X-1772 (ammoniacal alkyd resin salt marketed as a 66 to 68 percent (by weight) aqueous solution by British Resin Products).

2. Polycondensate of 1.25 mol of neopentylglycol, 0.55 mol of trimellitic acid, 0.2 mol of adipic acid and 0.35 mol of oleic acid.

3. Polycondensate of 0.65 mol of o-phthalic acid, 0.37 mol of neopentyl glycol and 0.3 mol of pentaerythritol.

4. Polycondensate of 0.3 mol of trimellitic acid, 0.2 mol of sebacic acid and 0.82 mol of neopentyl glycol.

5. Polycondensate of 0.3 mol of trimellitic acid, 0.2 mol of adipic acid and 0.82 mol of diethyleneglycol.

6. Polycondensate of 0.65 mol of o-phthalic acid, 0.37 mol of neopentyl glycol and 0.3 mol of trimethylolpropane.

7. Polycondensate of 0.3 mol of adipic acid, 0.45 mol of trimellitic acid and 1.15 mol of neopentyl glycol.

The alkyd resins mentioned under numbers 2-7 in table 2 are prepared as follows:

In a polymer tube bearing a sidearm the mixture of the starting products is placed. The tube is partially immersed in a 180° C. vapor bath in order to melt the mixture, and a capillary tube is introduced, which reaches to the bottom of the melt. The mixture is heated for 4 hours. The polymer is obtained on cooling.

The properties of said alkyd resins are assembled in the following table 3. The absolute viscosity in centipoise is measured in a 10 percent solution in sym.tetrachloroethane at 25° C. The intrinsic viscosity is also measured at 25° C. in sym.tetrachloroethane. The content of terminal carboxyl and hydroxyl groups is determined by titration.

TABLE 3

| Alkyd resin No. | −COOH meq./g. | −OH meq./g. | [η] dl./g. | η absolute cP |
| --- | --- | --- | --- | --- |
| 2 | 1.19 | 1.78 | 0.05 | 3.52 |
| 3 | 1.66 | 4.94 |  | 3.18 |
| 4 | 1.01 | 3.35 | 0.07 | 3.82 |
| 5 | 1.52 | 3.75 | 0.05 | 3.63 |
| 6 | 1.43 | 3.25 | 0.04 | 2.77 |
| 7 | 1.08 | 2.64 | 0.08 | 4.77 |

As volatile bases that are suited for being sued in the preparation of photoconductive layers according to the present invention may be mentioned: ammonia; methylamine, dimethylamine, trimethylamine, ethylamine, diethylamine, triethylamine, propylamine, isobutylamine, n-butylamine, ethylenediamine, allylamine, hydrazine, morpholine and piperidine. The use of ammonia is preferred. The pH of the coating composition from which the layer is applied preferably lies between 8 and 11.

The combination of melamine-formaldehyde condensate and alkyd resin salt of a volatile base for application in the present invention is always chosen in such a way that an aqueous solution is obtained. The higher the content of amino resin, the more the recording layer is brittle; therefore, in order to obtain a recording layer of high flexibility the ratio of melamine-formaldehyde condensate to alkyd resin should be preferable lower than 4:1. The higher the acid number or content of acid groupings in the salt-forming alkyd resin and the higher the content of methylol groups in the melamine polymer, the faster the cure on simply drying. In order to accelerate the curing, some free formaldehyde or a compound setting free formaldehyde may be sued in the coating composition.

The order of mixing steps for the constituents to form the coating is not important. The kind of photoconductor does not play a part; any known photoconductor, inorganic or organic, may be used. Since known photoconductive substances are not water-soluble they have to be dispersed preferably with a dispersing agent that does not markedly lower the dark-resistivity of the photoconductive element.

The quantitive ratios of the photoconductive substances to the binding agents may vary within wide limits. It is preferred to apply the photoconductive substance in a ratio of one part by weight of photoconductive substance to 0.1 to 0.6 part by weight of total content of binder. Preferably the coating mixture contains dispersed photoconductive zinc oxide in a weight ratio of 95 percent to 60 percent in respect of the total solid content of the coated and dried layer. The thickness of the photoconductive layer may be chosen between wide limits according to the requirements of each case. Good recording and reproduction results are attained with electrophotographic layers of a thickness between 1 and 20 $\mu$, and preferably between 3 and 10 $\mu$. Too thin layers possess an insufficient insulating power, whereas too thick layers require long exposure times.

The photoconductive recording layers prepared according to the present invention may contain, in addition to the photoconductive substance(s) and binder, optical sensitizer (see e.g. Belgian Pat. No. 612,102) and additives known in coating techniques, e.g. pigments (see e.g. Belgian Pat. No. (609,056), compounds influencing the gloss and/or the viscosity, and compounds which counteract ageing and/or oxidation of the layers, or which influence the thermal stability of the layers. When selecting any additives preference is given to those additives, which least reduce the dark-resistivity of the photoconductive layer.

The photoconductive coating composition according to the present invention may be coated on a support by a known coating technique e.g. by spraying, whirling, dipcoating or by a coating technique wherein use is made of a doctor blade. The supports or base materials are chosen in view of the particular charging, exposing, recording, developing and/or transfer technique wherein the recording material is to be used.

In electrophotographic recording techniques wherein the photoconductive layer is electrostatically charged, the support has preferably an electric volume resistivity considerably lower than that of the recording layer. Suitable supports are described, e.g. in the Belgian Pat. Nos. 602,794, 610,060 and 612,102 and in U.S. Pat. No. 3,008,825.

The photoconductive layer of an electrophotographic material prepared starting from a coating composition according to the present invention can be used for recording purposes wherein prior to exposure an electric charge is nondifferentially applied according to known methods. The material can, however, also be used in recording techniques wherein the exposure step precedes a charging step. For such a technique we refer, e.g., to Belgian Pat. No. 625,335.

The following examples illustrate the present invention.

EXAMPLE 1

The improved chargeability of different photoconductive compositions prepared from a mixture of a photoconductor, an alkyd resin salt of a volatile base and a melamine-formaldehyde resin compared with compositions prepared from a mixture of photoconductor and said alkyd resin salt and melamine resin separately is illustrated in table 4.

To 20 g. of photoconductive zinc oxide 50 cc. of an ammoniacal binder solution (pH>8) containing 5 g. of binder of the type and in a ratio as indicated in the table 4 are added. The mixture is ground for 2 hours in a ball mill and the obtained dispersion applied pro rata of 150 ccs./sq.m. to an aluminium-coated paper support. The coated layer is dried for 24 hours at room temperature and cured for 1 minute at 100° C.

Samples of the obtained materials are under the same circumstances negatively charged with a corona-discharging apparatus having between the ground and the wires a potential difference of -6,000 v. The voltage appearing at the electrometer terminals by passing the samples under the probe of a dynamic-capacitor electrometer as described by Giaimo, R.C.A. Review, 2 (1961), 780–790, is measure of the charge density obtained. These voltage values are listed in table 4.

TABLE 4

| % by weight of alkyd resin (No. 1 of table 2) | % by weight of melamine-formaldehyde resin (No. 1 of table 1) | Voltage values (V) |
|---|---|---|
| 100 | 0 | 66 |
| 80 | 20 | 250 |
| 70 | 30 | 170 |
| 50 | 50 | 250 |
| 40 | 60 | 133 |
| 30 | 70 | <50 |
| 20 | 80 | <550 |
| 0 | 100 | <50 |

Analogous results are obtained, e.g., when replacing the binders of the above-mentioned combination by those listed in table 5.

TABLE 5

| Number of alkyd resin of table 1 | Number of melamine-formaldehyde resin of table 2 |
|---|---|
| 1 | 3 |
| 1 | 6 |
| 1 | 2 |
| 1 | 4 |
| 1 | 5 |
| 2 | 1 |
| 3 | 1 |
| 4 | 1 |
| 5 | 1 |
| 6 | 1 |
| 7 | 1 |

The electrophotographic materials prepared as described above and having a ratio by weight of 90/10 to 40/60 of alkyd resin to melamine-formaldehyde resin are very suited for the so-called "electrophoretic development" using dispersions of pigments in high insulating liquids, which have a low dielectric constant, such as developers described in U.S. Pat. No. 2,907,674.

The electrophotographic coatings prepared as described in example 1, having a ratio by weight of 90/10 to 40/60 of alkyd resin to melamine-formaldehyde resin are very suited to prepare an offset-master according to the technique described in U.S. Pat. No. 3,170,169.

EXAMPLE 2

Example 1 is repeated but to the mentioned combinations monobutyl phosphate is added in a ratio of 1 percent by weight of the photoconductive zinc oxide. The monobutyl phosphate improves the chargeability especially in conditions of relative humidity of the air exceeding 45 percent.

EXAMPLE 3

Example 1 is repeated but the electrophotographic coating compositions are applied to a glassine-type paper support of 60 g./m.$^2$.

We claim:

1. An electrophotographic recording material comprising a photoconductive insulating layer applied on an electrically conductive support, which layer contains a photoconductor dispersed in an insulating binder medium, characterized in that the binder medium is a cured reaction product of a mixture of a melamine-formaldehyde resin and a salt of a volatile base and an alkyd resin which contains free acid groups and is insoluble in water in acidic form, both said melamine-formaldehyde resin and said salt being water-soluble prior to curing.

2. An electrophotographic recording material according to claim 1, characterized in that the binder medium has been produced by drying an aqueous alkaline coating composition containing dissolved therein said mixtures of said resin and said salt.

3. An electrophotographic recording material according to claim 1, wherein the photoconductive substance is photoconductive zinc oxide.

4. An electrophotographic recording material according to claim 1, wherein the volatile base is ammonia.

5. An electrophotographic recording material according to claim 1, wherein the support is a glassine type paper support.

6. An electrophotographic recording material according to claim 2, wherein the cured binder medium has been produced from a salt of the volatile base and the alkyd resin, and the melamine-formaldehyde resin in a ratio by weight varying between 9:1—4:6.

7. An electrophotographic recording material according to claim 1, wherein the photoconductive substance has been dispersed in the binder medium in a ratio of one part by weight to 0.1 to 0.6 part by weight of total content of binder.